United States Patent
Qiu

(10) Patent No.: US 12,095,662 B2
(45) Date of Patent: Sep. 17, 2024

(54) IN-SITU FLOW DETECTION METHOD AND ELECTRONIC DEVICE

(71) Applicant: New H3C Technologies Co., Ltd., Zhejiang (CN)

(72) Inventor: Yuanxiang Qiu, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 18/001,865

(22) PCT Filed: Mar. 25, 2021

(86) PCT No.: PCT/CN2021/082981
§ 371 (c)(1),
(2) Date: Dec. 14, 2022

(87) PCT Pub. No.: WO2022/198560
PCT Pub. Date: Sep. 29, 2022

(65) Prior Publication Data
US 2023/0231804 A1 Jul. 20, 2023

(51) Int. Cl.
*H04L 45/00* (2022.01)
*H04L 9/40* (2022.01)
(Continued)

(52) U.S. Cl.
CPC ............ *H04L 45/566* (2013.01); *H04L 12/12* (2013.01); *H04L 12/4633* (2013.01);
(Continued)

(58) Field of Classification Search
CPC ... H04L 45/566; H04L 12/12; H04L 12/4633; H04L 41/04; H04L 41/34; H04L 43/028;
(Continued)

(56) References Cited

U.S. PATENT DOCUMENTS

| | | |
|---|---|---|
| 10,582,027 B2 | 3/2020 | Bhandari et al. |
| 2019/0141168 A1 | 5/2019 | Bhandari et al. |

(Continued)

FOREIGN PATENT DOCUMENTS

| | | |
|---|---|---|
| CN | 111277426 A | 6/2020 |
| CN | 111953604 A | 11/2020 |

(Continued)

OTHER PUBLICATIONS

Zhang, "Transmission method for detection message, and method and equipment for determining reverse path (English)", May 17, 2022, ip.com, 38 pages. (Year: 2022).*

(Continued)

*Primary Examiner* — Brian J. Gillis
*Assistant Examiner* — Chhian (Amy) Ling
(74) *Attorney, Agent, or Firm* — McCoy Russell LLP

(57) ABSTRACT

Embodiments of the present disclosure provide an in-situ flow detection method and an electronic device. The method includes: receiving a first service packet carrying a first packet header, where the first packet header includes at least a first in-situ flow detection option which is added to the first packet header by an ingress node of a first network domain and is for indicating an in-situ flow detection; and when the network device is an ingress node of a second network domain, forwarding a second service packet in the second network domain; where the second service packet is obtained by encapsulating a second packet header in an outer layer of the first service packet, the second packet header includes at least a second in-situ flow detection option.

20 Claims, 6 Drawing Sheets

(51) Int. Cl.

| | |
|---|---|
| *H04L 12/12* | (2006.01) |
| *H04L 12/46* | (2006.01) |
| *H04L 41/04* | (2022.01) |
| *H04L 41/34* | (2022.01) |
| *H04L 43/028* | (2022.01) |
| *H04L 45/02* | (2022.01) |
| *H04L 45/74* | (2022.01) |

(52) U.S. Cl.
CPC .............. *H04L 41/04* (2013.01); *H04L 41/34* (2022.05); *H04L 43/028* (2013.01); *H04L 45/04* (2013.01); *H04L 45/38* (2013.01); *H04L 45/74* (2013.01); *H04L 63/0428* (2013.01)

(58) Field of Classification Search
CPC ......... H04L 45/04; H04L 45/38; H04L 45/74; H04L 63/0428
See application file for complete search history.

(56) References Cited

U.S. PATENT DOCUMENTS

| | | | | |
|---|---|---|---|---|
| 2019/0379572 | A1* | 12/2019 | Yadav | H04L 41/12 |
| 2019/0394124 | A1* | 12/2019 | Pignataro | H04L 45/70 |
| 2020/0052979 | A1 | 2/2020 | Clemm et al. | |
| 2020/0162375 | A1* | 5/2020 | Chen | H04L 45/34 |
| 2021/0266189 | A1* | 8/2021 | Xie | H04L 67/56 |
| 2022/0337497 | A1* | 10/2022 | Huang | H04L 47/10 |
| 2022/0400072 | A1* | 12/2022 | Zhou | H04L 43/0811 |
| 2023/0006906 | A1* | 1/2023 | Shu | H04L 43/0852 |
| 2023/0045227 | A1* | 2/2023 | Chu | H04L 45/741 |

FOREIGN PATENT DOCUMENTS

| | | | | |
|---|---|---|---|---|
| CN | 114513429 | A * | 5/2022 | ............ H04L 43/08 |
| EP | 3893435 | A1 | 10/2021 | |
| JP | 2008167331 | A | 7/2008 | |
| WO | 2019089494 | A1 | 5/2019 | |
| WO | 2020114083 | A1 | 6/2020 | |

OTHER PUBLICATIONS

Wang, Y. et al., "BGP-LS Extensions for In-situ Flow Information Telemetry (IFIT) Capability Advertisement draft-wang-idr-bgpls-extensions-ifit-00" IETF Website, Available Online at https://datatracker.ietf.org/doc/draft-wang-idr-bgpls-extensions-ifit/, Jul. 13, 2020, 9 pages.

ISA State Intellectual Property Office of the People's Republic of China, International Search Report Issued in Application No. PCT/CN2021/082981, Dec. 22, 2021, WIPO, 4 pages.

Bhandari, S. et al., "In-situ OAM IPv6 Options draft-ietf-ippm-ioam-ipv6-options-02," Data Tracker Website, Available Online at https://datatracker.ietf.org/doc/draft-ietf-ippm-ioam-ipv6-options/, Available as Early as Jul. 13, 2020, 9 pages.

Song, H. et al., "In-situ Flow Information Telemetry draft-song-opsawg-ifit-framework-12," Data Tracker Website, Available Online at https://datatracker.ietf.org/doc/html/draft-song-opsawg-ifit-framework-12, Available as Early as Apr. 14, 2020, 55 pages.

Chen, H. et al., "Path Computation Element Communication Protocol (PCEP) Extensions to Enable IFIT draft-chen-pce-pcep-ifit-00," Data Tracker Website, Available Online at https://datatracker.ietf.org/doc/draft-chen-pce-sr-policy-ifit/. Available as Early as Aug. 28, 2020, 33 pages.

Brockners, F. et al., "In-situ OAM Deployment draft-brockners-opsawg-ioam-deployment-02," Data Tracker Website, Available Online at https://datatracker.ietf.org/doc/draft-brockners-opsawg-ioam-deployment/, Available as Early as Sep. 7, 2020, 22 pages.

Fioccola, G. et al., "IPv6 Application of the Alternate Marking Method draft-ietf-6man-ipv6-alt-mark-04," Data Tracker Website, Available Online at https://datatracker.ietf.org/doc/html/draft-ietf-6man-ipv6-alt-mark-04XP15144823A, Available as Early as Mar. 8, 2021, 16 pages.

ISA State Intellectual Property Office of the People's Republic of China, Written Opinion of the International Searching Authority Issued in Application No. PCT/CN2021/082981, Dec. 22, 2021, WIPO, 8 pages.

European Patent Office, Extended European Search Report Issued in Application No. 21932187.4, Apr. 4, 2023, Germany, 12 pages.

Fioccola, G. et al., "IPV6 Application of the Alternate Marking Method draft-ietf-6man-ipv6-alt-mark-02," Internet Engineering Task Force (IETF) Website, Available Online at https://datatracker.ietf.org/doc/html/draft-ietf-6man-ipv6-alt-mark-02, Oct. 13, 2020, 29 pages.

Bhandari, S. et al., "In-situ OAM IPv6 Options, draft-ietf-ippm-ioam-ipv6-options-05," Internet Engineering Task Force (IETF) Website, Available Online at https://datatracker.ietf.org/doc/html/draft-ietf-ippm-ioam-ipv6-options-05, Feb. 21, 2021, 27 pages.

European Patent Office, Office Action Issued in Application No. 21932187.4, Jan. 31, 2024, Netherlands, 9 pages.

Korean Intellectual Property Office, Office Action Issued in Application No. 10-2022-7042506, Apr. 26, 2024, 10 pages. (Submitted with Machine Translation).

* cited by examiner

| Version | Traffic Class | Flow Label | Payload Length | Next header | Hop Limit |
|---|---|---|---|---|---|
| Source Address ||||||
| Destination Address ||||||

| 1 2 3 4 5 6 7 8 1 2 3 4 5 6 7 8 1 2 3 4 5 6 7 8 1 2 3 4 5 6 7 8 |
|---|
| Option Type | Option Data Len |
| L\|D\|R\|R | NextHeader |
| Reserved | Peroid |
| FlowMonID |
| FlowMonExtID | Reserved |
| IOAM-Trace-Type |
| TLVs |

FIG. 6

IN-SITU FLOW DETECTION METHOD AND ELECTRONIC DEVICE

CROSS REFERENCE TO RELATED APPLICATION

This application is the national phase of International Application No. PCT/CN2021/082981 filed on Mar. 25, 2021, the disclosure of which is hereby incorporated by reference in its entirety.

TECHNICAL FIELD

The present disclosure relates to the field of network communication technologies, and in particular to an in-situ flow detection method and an electronic device.

BACKGROUND

In-situ flow detection (e.g., in-situ operations administration and maintenance (IOAM)) refers to a network detection utilizing a normally forwarded service packet. In-situ flow detection can be completed by cooperation of network devices and an analyzer, and can be implemented in the following way.

A network device acting as an ingress node inserts detection control information into a service packet, collects data based on the detection control information inserted in the service packet, and reports the collected data to the analyzer. A network device acting as a transmitting node or an egress node, collects data based on the detection control information inserted in the service packet and reports the collected data to the analyzer. The analyzer detects and identifies anomalies in the network based on the collected data reported by each of the devices, so as to accurately detect the delay and packet loss and other performance of each service, making network quality Service-Level Agreement (SLA) visible in real time, and achieving rapid fault delimitation and location.

However, the existing in-situ flow detection is limited to a same network domain, such as a SRv6 domain, a BIERv6 domain. Once a service flow is forwarded across domains, the in-situ flow detection cannot be realized.

SUMMARY

Examples of the present disclosure provide an in-situ flow detection method and an electronic device to implement in-situ flow detection based on cross-domain forwarding service packets in cross-domain forwarding scenarios.

As an example, examples of the present disclosure are implemented by the following solutions.

An in-situ flow detection method, applied to a network device, the method includes:
  receiving a first service packet carrying a first packet header, where the first packet header includes at least a first in-situ flow detection option which is added to the first packet header by an ingress node of a first network domain, and is for indicating an in-situ flow detection; and
  when the network device is an ingress node of a second network domain, forwarding a second service packet in the second network domain; where the second service packet is obtained by encapsulating a second packet header in an outer layer of the first service packet, the second packet header includes at least a second in-situ flow detection option, and the second in-situ flow detection option is for indicating that the in-situ flow detection is performed on a same service flow in a same in-situ flow detection mode as the first in-situ flow detection option.

Optionally, the second in-situ flow detection option is obtained by copying the first in-situ flow detection option; or, a detection control information field in the first in-situ flow detection option and a detection control information field in the second in-situ flow detection option include same detection control information; the detection control information is used to indicate the service flow and the in-situ flow detection mode.

Optionally, the detection control information field at least includes: a FlowMonID field for indicating a service flow; an in-situ flow detection mode field for indicating an in-situ flow detection mode.

Optionally, the in-situ flow detection mode field includes at least one of the following fields:
  an L field for indicating a packet loss flag;
  a D field for indicating a delay flag;
  a FlowMonID Ext field for indicating a node identifier of the ingress node of the first network domain;
  an IOAM-Trace-type field for indicating a data type of data for the in-situ flow detection.

Optionally, the FlowMonID field occupies 20 bits.

Optionally, the L field and the D field occupy 1 bit respectively.

Optionally, the FlowMonID Ext field occupies 20 bits.

Optionally, the IOAM-Trace-type field occupies 24 bits.

Optionally, the detection control information field further includes: a Period field for indicating a period of the in-situ flow detection.

Optionally, the first in-situ flow detection option and the second in-situ flow detection option include other fields in addition to the detection control information field; the other fields at least include: a NextHeader field for indicating whether a type of extended data is carried, where when the NextHeader field is a first value, the NextHeader field indicates that a type of extended data is not carried, and when the NextHeader field is a second value, the NextHeader field indicates that a type of extended data is carried; a TLVs (Type-Length-Value) field indicating a type of extended data, for indicating extended data being carried in the TLVs field when the NextHeader field is the second value; where the extended data includes at least identifiers of one or more nodes through which a service packet passes.

Optionally, the second packet header includes an IPv6 extension header, where the second in-situ flow detection option is an option of a Destination Option Header (DOH) in the IPv6 extension header.

An example provides an electronic device including a processor and a machine-readable storage medium;
  where the machine-readable storage medium stores machine-executable instructions that can be executed by the processor;
  the processor is configured to execute the machine-executable instructions to implement steps of any method described above.

An embodiment of the present disclosure further provides a non-transitory machine-readable storage medium storing computer instructions, where the computer instructions are executed by a processor to implement the methods according to the above embodiments of the present disclosure.

Through the above technical solutions of the present disclosure, in the present disclosure, even if a first service packet is forwarded across domains, for example, from a first network domain to a second network domain, upon receiving the first service packet, instead of simply encapsulating the first service packet based on the second network domain, the ingress node of the second network domain also refers to the first in-situ flow detection option carried in the first service packet to perform the encapsulation, so that the packet header encapsulated in the outer layer of the first service packet carries the second in-situ flow detection option. Therefore, in-situ flow detection can be performed in the second network domain based on the second in-situ flow detection option, that is, in-situ flow detection can be implemented during the cross-domain forwarding of the first service packet.

BRIEF DESCRIPTION OF THE DRAWINGS

FIG. 6 is a diagram illustrating a structure of an in-situ flow detection option according to an example of the present disclosure;

DETAILED DESCRIPTION OF THE EMBODIMENTS

Figure 1:
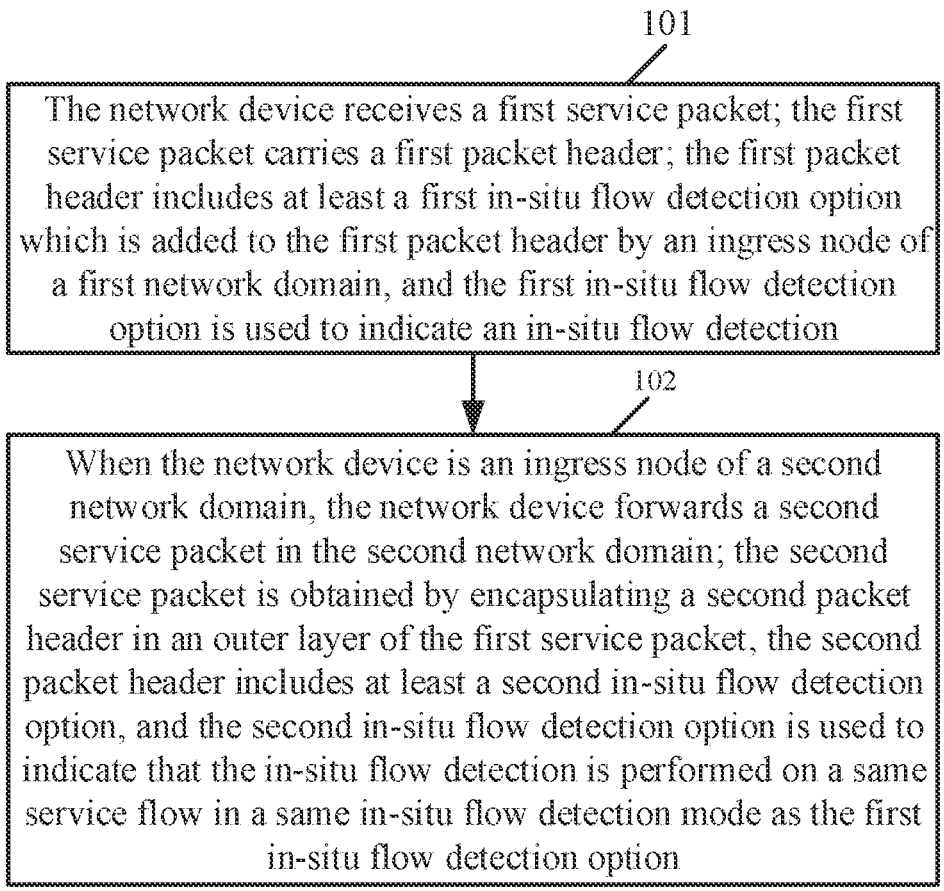
FIG. 1 is a flowchart of a method according to an example of the present disclosure.

Examples will be described in detail herein, with the illustrations thereof represented in the drawings. When the following descriptions involve the drawings, like numerals in different drawings refer to like or similar elements unless otherwise indicated. The implementations described in the following examples do not represent all examples consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms "a", "the" and "said" in the singular form used in the present disclosure and the appended claims are also intended to include plurality, unless otherwise clearly indicated in the context.

In order to enable those skilled in the art to better understand the technical solutions according to the examples of the present disclosure, and make the above objects, features and advantages of the embodiments of the present disclosure clearer, the technical solutions in the examples of the present disclosure will be further described in detail below in conjunction with the accompanying drawings.

Referring to FIG. 1, which is a flowchart of a method according to an example of the present disclosure. This method is applied to a network device, where the network device can be a router, a switch, or the like, which is not specifically limited in this example.

As shown in FIG. 1, the method can include the following steps.

In step 101, the network device receives a first service packet; the first service packet carries a first packet header; the first packet header includes at least a first in-situ flow detection option which is added to the first packet header by an ingress node of a first network domain, and the first in-situ flow detection option is used to indicate an in-situ flow detection.

Here, the first service packet and the first packet header are only named for ease of description, and not for limitation. Proceed to step 101, the first packet header is an outer packet header of the first service packet.

Optionally, in this example, upon receiving an original service packet, the ingress node of the first network domain can identify whether the original service packet is a target packet to be subjected to in-situ flow detection based on a pre-configured in-situ flow detection mode. When it is identified that the original service packet is a target packet to be subjected to in-situ flow detection, an outer layer of the original service packet can be encapsulated with an outer packet header (the first packet header as mentioned above) carrying the first in-situ flow detection option. As for how the ingress node of the first network domain encapsulates the first packet header carrying the first in-situ flow detection option in the outer layer of the original service packet, it will be described in specific examples below, and will not be elaborated here.

For ease of description, the original service packet with the first packet header carrying the first in-situ flow detection option encapsulated in the outer layer is denoted as the first service packet, and the ingress node of the first network domain forwards the first service packet in the first network domain. During the forwarding process, the network device may receive the first service packet. Once the first service packet is received, step 101 is performed.

In this example, the first in-situ flow detection option is used to indicate in-situ flow detection. Specifically, the first in-situ flow detection option can indicate a service flow to which the first service packet belongs and the in-situ flow detection mode. Optionally, in this example, the service flow to which the first service packet belongs can be identified by a source address and a destination address of the original service packet. As for the in-situ flow detection mode, it will be described by examples below, and will not be elaborated here.

In step 102, when the network device is an ingress node of a second network domain, the network device forwards a second service packet in the second network domain. The second service packet is obtained by encapsulating a second packet header in an outer layer of the first service packet. The second packet header includes at least a second in-situ flow detection option, and the second in-situ flow detection option is used to indicate that the in-situ flow detection is performed on a same service flow in a same in-situ flow detection mode as the first in-situ flow detection option.

This step 102 is performed on the premise that the network device is the ingress node of the second network domain. When the network device, serving as the ingress node of the second network domain, receives the first service packet carrying the first in-situ flow detection option in the first packet header as described above, it is indicated that the first service packet has not left the first network domain, and the first service packet is forwarded across domains (that is, forwarded from the first network domain to the second network domain). In this case, as described in step 102, the network device encapsulates an outer packet header in the outer layer of the first service packet. To facilitate the distinction, the outer packet header encapsulated in the outer layer of the first service packet can be denoted as a second packet header. At this time, the second packet header here refers to the outer packet header, and the first packet header originally carried by the first service packet can be referred to as an inner packet header, in contrast to the second packet header. To facilitate the distinction, at this time, the first service packet with the second packet header encapsulated in the outer layer can be denoted as the second service packet.

In this example, the second packet header includes at least a second in-situ flow detection option. The second in-situ flow detection option is used to indicate that the in-situ flow detection is performed in the second network domain. In this example, once the second in-situ flow detection option is carried in the second header of the second service packet, the ingress node of the second network domain (that is, the network device), one or more transmitting nodes through which the second service packet passes in the second network domain, and an egress node of the second network domain will perform in-situ flow detection based on the second in-situ flow detection option.

In this example, both the second in-situ flow detection option and the first in-situ flow detection option achieve in-situ flow detection on the same service flow in the same mode. Based on this, the second in-situ flow detection option is used to indicate that the in-situ flow detection is performed on the same service flow in the same in-situ flow detection mode as the first in-situ flow detection option.

Through the process shown in FIG. 1, even if the first service packet is forwarded across domains, for example, from the first network domain to the second network domain, upon receiving a first service packet, instead of simply encapsulating the first service packet based on the second network domain, the ingress node of the second network domain also refers to the first in-situ flow detection option carried in the first packet header of the first service packet to perform the encapsulation, so that the outer packet header encapsulated in the outer layer of the first service packet carries the second in-situ flow detection option. Therefore, in-situ flow detection can be performed in the second network domain based on the second in-situ flow detection option, that is, in-situ flow detection can be implemented during the cross-domain forwarding of the first service packet.

As an example, the second in-situ flow detection option is the same as the first in-situ flow detection option. Optionally, the second in-situ flow detection option can be obtained by copying the first in-situ flow detection option.

As another example, the second in-situ flow detection option may not be obtained by copying the first in-situ flow detection option, but is allowed as long as same detection control information is contained in a detection control information field of the second in-situ flow detection option and a detection control information field of the first in-situ flow detection option. Here, the detection control information is used to indicate the service flow and the in-situ flow detection mode.

Optionally, in this example, the detection control information field at least includes the following fields: a FlowMonID field and an in-situ flow detection mode field.

The FlowMonID field is used to indicate the service flow. Optionally, the FlowMonID field can occupy 20 bits. Here, a service flow can be represented by both of a source address and a destination address.

The in-situ flow detection mode field is used to indicate an in-situ flow detection mode. In this example, the in-situ flow detection mode field includes at least one of the following fields: an L field, a D field, a FlowMonID Ext field, and an IOAM-Trace-type field.

The L field is used to indicate a packet loss flag. For example, when the packet loss flag takes a first value, such as 0, it indicates that packet loss detection is performed, and when the packet loss flag takes a second value, such as 1, it indicates that packet loss detection is not performed. Optionally, in this example, the L field occupies 1 bit.

The D field is used to indicate a delay flag. For example, when the delay flag is a third value, such as 0, it indicates that delay detection is performed, and when the delay flag is a fourth value, such as 1, it indicates that delay detection is not performed. Optionally, in this example, the D field occupies 1 bit.

The FlowMonID Ext field is used to indicate a node identifier of the ingress node of the first network domain Optionally, the FlowMonID Ext field occupies 20 bits.

The IOAM-Trace-type field is used to indicate a data type of data under in-situ flow detection. Optionally, the IOAM-Trace-type field occupies 24 bits, and each bit represents a data type. For example, taking in-situ flow detection being used to detect the delay as an example, such data type can include: timestamp information on the received packet, packet count information, and the like.

Figure 2:
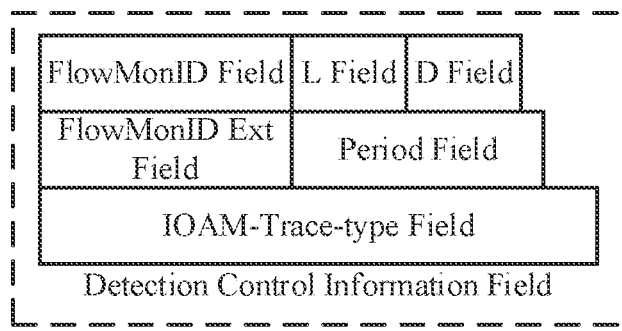
FIG. 2 is a diagram illustrating a structure of a detection control information field according to an example of the present disclosure.

FIG. 2 illustrates a structure of the detection control information field with reference to an example of an in-situ flow detection mode field including an L field, a D field, a FlowMonID Ext field, and an IOAM-Trace-type field.

As an example, the detection control information field can further include: a Period field. Here, the Period field is used to indicate a period of in-situ flow detection. As an example, the Period field occupies 8 bits. Still taking in-situ flow detection being used to detect the delay as an example, the packet count information refers to information about the number of packets counted in a period.

Optionally, as an example, the first in-situ flow detection option and second in-situ flow detection option can include other fields in addition to the detection control information field. For example, other fields can include a NextHeader field, a TLVs (Type-Length-Value) field indicating a type of extended data, and so on.

The NextHeader field is used to indicate whether a type of extended data is carried. When the NextHeader field is a first value, it indicates that a type of extended data is not carried, and when the NextHeader field is a second value, it indicates that a type of extended data is carried.

When the NextHeader field is the second value, the TLVs field is used to indicate extended data being carried in the TLVs field. The extended data includes at least identifiers of one or more nodes through which a service packet passes.

Figures 3, 4:
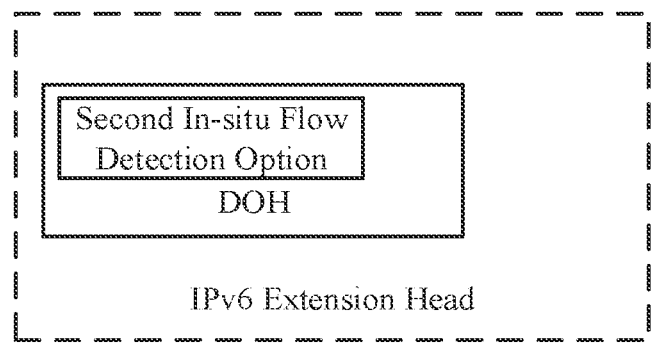
FIG. 3 is a diagram schematically illustrating an IPv6 extension header according to an example of the present disclosure.
FIG. 4 is a diagram schematically illustrating an IPv6 basic header according to an example of the present disclosure.

In an IPv6 scenario, the second packet header can include an IPv6 extension header. FIG. 3 shows an example of a structure of the IPv6 extension header. As an example, the second in-situ flow detection option is an option of a destination option header (DOH) in the IPv6 extension header.

As an example, if the first service packet is a unicast packet and the second network domain is based on an IPV6 segment routing (SR), the IPv6 extension header further includes a segment routing header (SRH). In this example, when performing hop-by-hop in-situ flow detection, the DOH is before the SRH in the IPV6 extension header. When performing end-to-end in-situ flow detection, the DOH is after the SRH in the IPV6 extension header. In this example, the SRH is used to carry path information on the second service packet being forwarded in the second network domain, and the structure thereof is similar to the existing SRH encapsulation format.

It should be noted that, in this example, optionally, the second packet header further includes: an IPv6 header. The IPv6 header here is different from the IPv6 extension header. Compared with the IPv6 extension header, the IPv6 header here can be denoted as an IPv6 basic header, and the structure thereof is shown in FIG. 4. In an example, in the second packet header, the IPv6 basic header is before the IPv6 extension header. In-situ flow detection of a unicast packet is illustrated below through an example shown in FIG. 5.

As another example, if the first service packet is a multicast packet, the ingress node of the second network domain supports bit indexed explicit replication (BIER), and the second network domain is a BIER domain, the IPv6 extension header further includes a BIER packet header.

BIER is a new multicast technology based on bit indexed explicit replication. This technology does not need to explicitly establish a multicast distribution tree, nor does it require intermediate nodes to save any multicast flow state. A router with BIER capability is referred to as a bit-forwarding router (BFR). A domain composed of BFRs is referred to as a BIER domain, and BFRs at the edge of the BIER domain are referred to as a bit-forwarding ingress router (BFIR) and a bit-forwarding egress router (BFER), respectively. BFRs in the BIER domain exchange information such as an identifier of a BFR, a BIER subdomain where the BFR is located, and BIER forwarding capability by running a control plane protocol, and calculate and generate a bit index forwarding table (BIFT) based on such information. The BIFT includes a Forwarding Bitmask (F-BM) and a BFR neighbor. Each bit of the F-BM represents a unique BFR in the BIER domain, which is defined by an identifier BFR-id of the BFR. When a multicast packet enters the BIER domain, the BFIR determines a BFER set for the multicast packet in the BIER domain, and then encapsulates a BIER packet header in the multicast packet. When the multicast packet reaches a BFER, the BFER decapsulates the out BIER packet header to recover the inner multicast packet, and continues to perform forwarding of the multicast packet. Hereinafter, the forwarding of the multicast packet will be described below through the example shown in FIG. 7, which will not be elaborated here.

In this example, the BIER packet header carries the BFER set. Optionally, in this example, the BFER set can be represented by a bit string (BitString), where a bit of which the value is set to 1 in the BitString indicates a corresponding BFER.

As an example, the BIER packet header can be another option in the DOH. Optionally, in this example, when performing hop-by-hop in-situ flow detection, the second in-situ flow detection option can be before the BIER packet header in the DOH. When performing end-to-end in-situ flow detection, the second in-situ flow detection option can be after the BIER packet header in the DOH.

The process shown in FIG. 1 will be described below in conjunction with two examples:

Example 1

Figure 5:
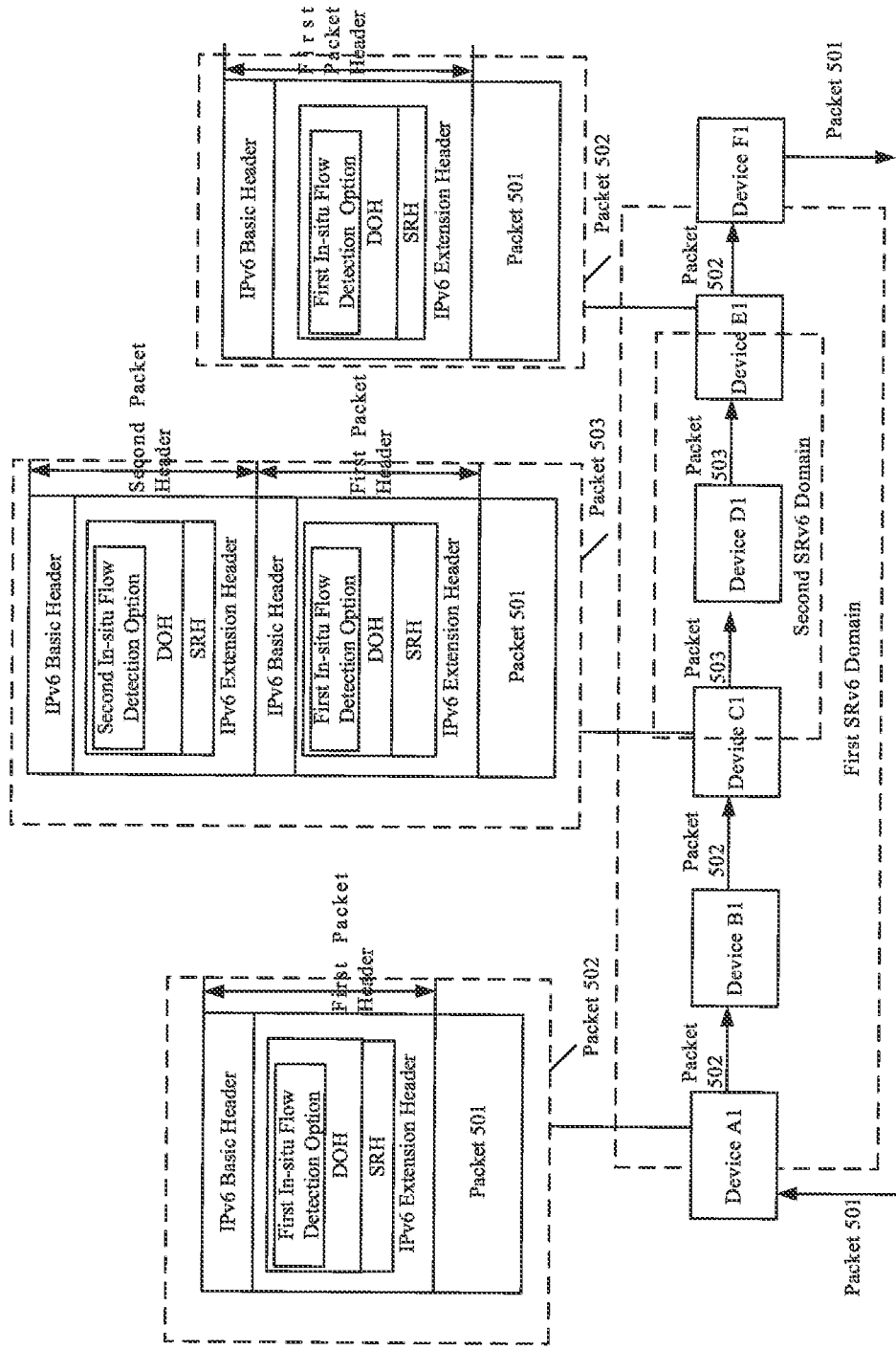
FIG. 5 is a schematic diagram of networking according to Example 1 of the present disclosure.

Referring to FIG. 5, FIG. 5 is a schematic diagram of networking according to Example 1 of the present disclosure. In this example, description will be given with reference to in-situ flow detection when a SRv6 unicast packet is forwarded across domains for example.

As shown in FIG. 5, as an ingress node in a first SRv6 domain, a device A1 receives an original SRv6 unicast packet (denoted as a packet 501), then analyzes packet characteristics such as a source address, a destination address, or the like. When based on the analyzed packet characteristics and with a pre-configured in-situ flow detection mode, the device A1 recognizes that the packet 501 needs to be performed in-situ flow detection, the device A1 encapsulates a packet header (denoted as a first packet header) in the outer layer of the packet 501. The encapsulated first packet header can include an IPv6 basic header and an IPv6 extension header. The IPv6 extension header includes at least DOH and SRH. The DOH is added with an option for in-situ flow detection, which is denoted as a first in-situ flow detection option. Optionally, based on the structure of the in-situ flow detection option described above, FIG. 6 illustrates the structure of the first in-situ flow detection option as an example. It should be noted that the IPv6 basic header and the SRH are encapsulated with a method similar to existing encapsulation methods, and will not be repeated here. In this example, hop-by-hop in-situ flow detection is taken as an example, and the DOH can be before the SRH in the IPv6 extension header.

In the example shown in FIG. 5, the device A1 obtains corresponding data, such as a packet receiving timestamp (or a timestamp of receiving a packet) and a packet count, based on a data type indicated by the IOAM-Trace-type field in the first in-situ flow detection option. The obtained data is reported to an analyzer.

For ease of description, the packet 501 encapsulated with the first packet header is denoted as the packet 502 above.

After that, the device A1 forwards the packet 502 to a device B1 based on path information in the SRH carried in the packet 502.

Upon receiving the packet 502, if the device B1 recognizes that the DOH of the packet 502 carries the first in-situ flow detection option, the device B1 obtains corresponding data, such as the packet receiving timestamp and the packet count, based on the data type indicated by the IOAM-Trace-type field in the first in-situ flow detection option, and reports the obtained data to the analyzer. After that, the device B1 forwards the packet 502 to a device C1 based on the path information in the SRH carried in the packet 502.

As shown in FIG. 5, the device C1 is an ingress node of a second SRv6 domain. Upon receiving the packet 502, if the device C1 recognizes that the DOH of the packet 502 carries the first in-situ flow detection option, the device C1 obtains corresponding data, such as the packet receiving timestamp and the packet count, based on the data type indicated by the IOAM-Trace-type field in the first in-situ flow detection option, and reports the obtained data to the analyzer. After that, the device C1 encapsulates a packet header (denoted as a second packet header) in the outer layer of the packet 502. The encapsulated second packet header can include an IPv6 basic header and an IPv6 extension header.

In this example, the IPv6 extension header in the second packet header includes at least DOH and SRH. The DOH is additionally provided with an option for in-situ flow detection, which is denoted as a second in-situ flow detection option. Optionally, the second in-situ flow detection option can be obtained by copying the first in-situ flow detection option. Or a detection control information field in the second in-situ flow detection option and a detection control information field in the first in-situ flow detection option include same detection control information, and the structure of the second in-situ flow detection option is similar to the structure of the first in-situ flow detection option shown in FIG. 6. For ease of description, the packet 502 encapsulated with the second packet header is denoted as a packet 503. It should be noted that the IPv6 basic header and the SRH in the outer packet header are encapsulated with a method similar to existing encapsulation methods, which will not be elaborated here.

After that, the device C1 forwards the packet 503 to a device D1 based on path information in the SRH carried in the packet 503.

Upon receiving the packet 503, if the device D1 recognizes that the DOH of the packet 503 carries a second in-situ flow detection option, the device D1 obtains the corresponding data such as the packet receiving timestamp and the packet count based on the data type indicated by the IOAM-Trace-type field in the second in-situ flow detection option, and reports the obtained data to the analyzer. After that, the device D1 forwards the packet 503 to a device E1 based on path information in the SRH carried in the packet 503.

If the device E1, serving as an egress node of the second SRv6 domain, recognizes that the DOH of the packet 503 carries a second in-situ flow detection option upon receiving the packet 503, the device E1 obtains the corresponding data such as the packet receiving timestamp and the packet count based on the data type indicated by the IOAM-Trace-type field in the second in-situ flow detection option, and reports the obtained data to the analyzer. After that, the device E1 removes the second packet header of the packet 503 to recover the packet 502, and forwards the packet 502 to a device F1 based on path information in the SRH carried in the packet 502.

The device F1 is the egress node of the first SRv6 domain. Upon receiving the packet 502, if the device F1 recognizes that the DOH of the packet 502 carries the first in-situ flow detection option, the device F1 obtains the corresponding data such as the packet receiving timestamp and the packet count based on the data type indicated by the IOAM-Trace-type field in the first in-situ flow detection option, and reports the obtained data to the analyzer. After that, the device F1 removes the inner packet header of the packet 502 and recovers the packet 501, and continues to forward the packet 501.

Upon receiving the data reported by the devices A1 to F1, the analyzer collects and determines data about the overall forwarding performance of the service flow to which the packet 501 belongs in the existing detection mode. This example does not specifically limit how the analyzer determines the data about the overall forwarding performance of the service flow, which can refer to the existing determination method.

It can be seen from Example 1 that even if a SRv6 unicast packet is forwarded from the first SRv6 domain to the second SRv6 domain, upon receiving a SRv6 unicast packet (such as the packet 502) from the first SRv6 domain, the ingress node (such as the device C1) of the second SRv6 domain does not simply encapsulate the outer layer of the SRv6 unicast packet (such as the packet 502) based on the second SRv6 domain. Instead, the device C1 also refers to the first in-situ flow detection option carried in the packet 502 when encapsulating, so that the outer layer of the SRv6 unicast packet (such as the packet 502) is encapsulated with the outer packet header at least carrying the second in-situ flow detection option. Finally, the nodes in the second SRv6 domain perform in-situ flow detection based on the second in-situ flow detection option carried in the outer packet header. Therefore, in-situ flow detection can be implemented when the SRv6 unicast packet is forwarded across domains.

The above description is made by Example 1 taking cross-domain forwarding a SRv6 unicast packet as an example, and the following description will be made by Example 2 taking cross-domain forwarding a SRv6 multicast packet as an example.

Example 2

Figure 7:
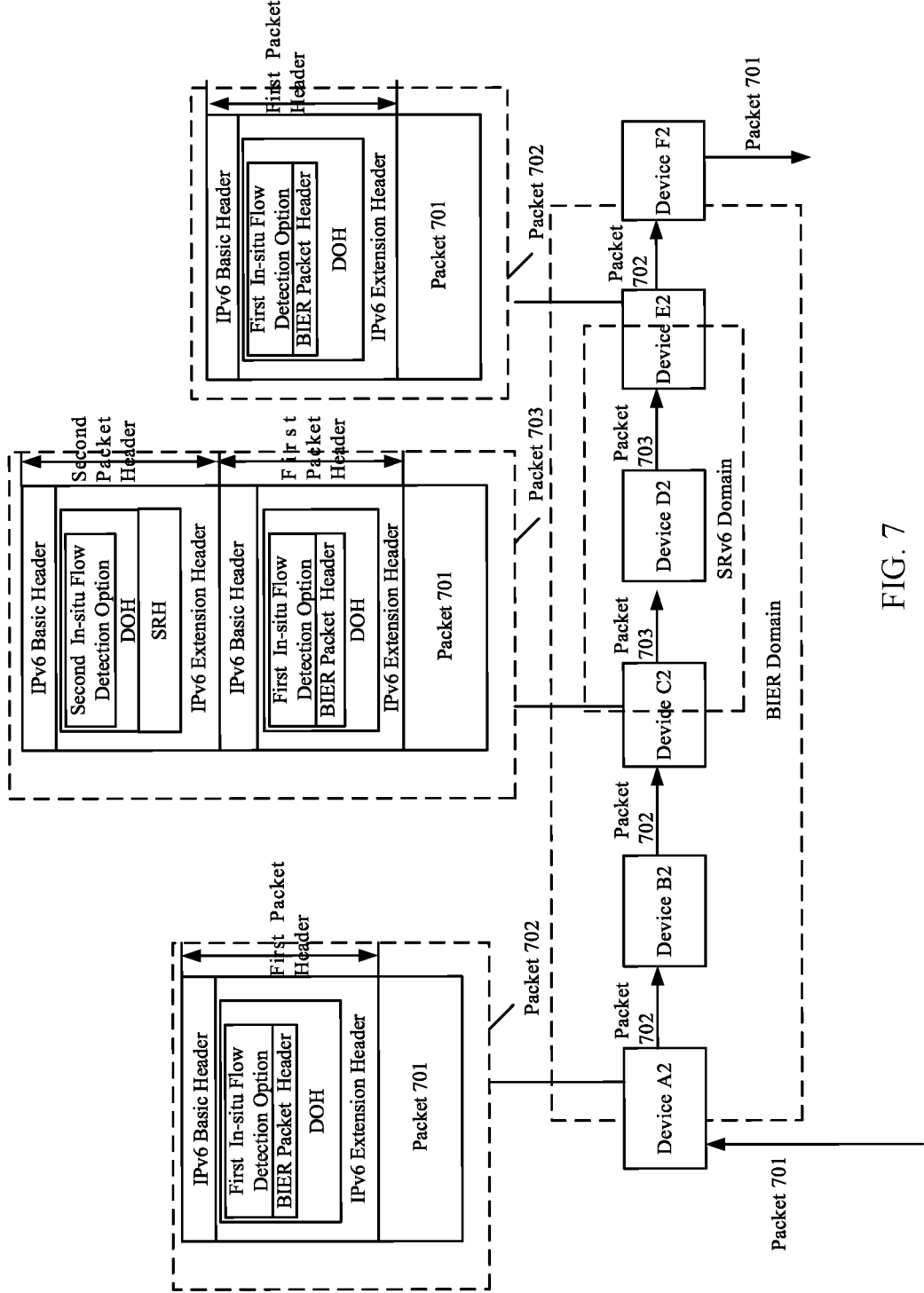
FIG. 7 is a schematic diagram of networking according to Example 2 of the present disclosure.

Referring to FIG. 7, FIG. 7 is a schematic diagram of networking according to Example 2 of the present disclosure. In this example, description will be given with reference to in-situ flow detection when a SRv6 multicast packet is forwarded across domains for example.

As shown in FIG. 7, as an ingress node of a BIER domain, upon receiving an original SRv6 multicast packet (denoted as a packet 701), a device A2 analyzes packet characteristics such as a source address, a destination address. When based on the analyzed packet characteristics and with a pre-configured in-situ flow detection mode, the device A2 recognizes that the packet 701 needs to be performed in-situ flow detection, the device A2 encapsulates an outer packet header (denoted as a first packet header) in the outer layer of the packet 701. The encapsulated first packet header can include an IPv6 basic header and an IPv6 extension header. The DOH in the IPv6 extension header includes two options, one of which is used for in-situ flow detection and is denoted as the first in-situ flow detection option, and the other option is a BIER packet header. If the in-situ flow detection in this example is a hop-by-hop in-situ flow detection, the first in-situ flow detection option is before the BIER packet header in the DOH. FIG. 7 shows a position order of the first in-situ flow detection option and the BIER packet header in the DOH through an example. It should be noted that the IPv6 basic header and IPv6 extension header are encapsulated with a method similar to existing encapsulation methods, and will not be repeated here. The BIER packet header carries a BFER set, which is a set of egress nodes when the packet 701 leaves the BIER domain.

In the example shown in FIG. 7, the device A2 obtains corresponding data such as the packet receiving timestamp and packet count based on the data type indicated by the IOAM-Trace-type field in the first in-situ flow detection option, and reports obtained data to an analyzer.

For ease of description, the packet 701 encapsulated with the first packet header is denoted as packet 702.

After that, the device A2 forwards the packet 702 to a device B2 based on the BFER set in the BIER packet header carried by the packet 702.

Upon receiving the packet 702, if the device B2 recognizes that the DOH of the packet 702 carries the first in-situ flow detection option, the device B2 obtains corresponding data such as the packet receiving timestamp and the packet count based on the data type indicated by the IOAM-Trace-type field in the first in-situ flow detection option, and reports the obtained data to the analyzer. After that, the device B2 forwards the packet 702 to a device C2 based on the BFER set in the BIER packet header carried in the packet 702.

As shown in FIG. 7, the device C2 is an ingress node of a SRv6 domain. Upon receiving the packet 702, if the device C2 recognizes that the DOH of the packet 702 carries the first in-situ flow detection option, the device C2 obtains corresponding data such as the packet receiving timestamp and the packet count based on the data type indicated by the IOAM-Trace-type field in the first in-situ flow detection option, and reports the obtained data to the analyzer. After that, the device C2 encapsulates an outer packet header (denoted as a second packet header) in the outer layer of the packet 702. The encapsulated second packet header can include an IPv6 basic header and an IPv6 extension header.

In this example, the IPv6 extension header in the second packet header includes DOH and SRH. The DOH is additionally provided with an option for in-situ flow detection, which is denoted as a second in-situ flow detection option. Optionally, the second in-situ flow detection option can be obtained by copying the first in-situ flow detection option, or a detection control information field in the second in-situ flow detection option and a detection control information field in the first in-situ flow detection option include same detection control information. For ease of description, the packet 702 encapsulated with the new packet header is denoted as a packet 703. The SRH carries path information on the packet 703 to be forwarded in the SRv6 domain. It should be noted that the IPv6 basic header and the SRH in the outer packet headers are encapsulated with a method similar to existing encapsulation methods, and will not be repeated here.

After that, the device C2 forwards the packet 703 to a device D2 based on the path information in the SRH carried in the packet 703.

Upon receiving the packet 703, if the device D2 recognizes that the DOH of the packet 703 carries a second in-situ flow detection option, the device D2 obtains corresponding data such as the packet receiving timestamp and the packet count based on the data type indicated by the IOAM-Trace-type field in the second in-situ flow detection option, and reports the obtained data to the analyzer. After that, the device D2 forwards the packet 703 to a device E2 based on the path information in the SRH carried in the packet 703.

As an egress node of the SRv6 domain, if the device E2 recognizes that the DOH of the packet 703 carries a second in-situ flow detection option upon receiving the packet 703, the device E2 obtains corresponding data such as the packet receiving timestamp and the packet count based on the data type indicated by the IOAM-Trace-type field in the second in-situ flow detection option, and reports the obtained data to the analyzer. After that, the device E2 removes the second packet header of the packet 703 to recover the packet 702, and forwards the packet 702 to a device F2 based on the BFER set in the BIER packet header carried in the packet 702.

The device F2 is the egress node of the BIER domain. Upon receiving the packet 702, if the device F2 recognizes that the DOH of the packet 702 carries the first in-situ flow detection option, the device F2 obtains corresponding data such as the packet receiving timestamp and the packet count based on the data type indicated by the IOAM-Trace-type field in the first in-situ flow detection option, and reports the obtained data to the analyzer. After that, the device F2 removes the packet header of the packet 702 to recover the packet 701, and continues to forward the packet 701.

Upon receiving the data reported by the devices A2 to F2, the analyzer collects and determines data about the overall forwarding performance of the service flow to which the packet 701 belongs in the existing detection mode. This example does not specifically limit how the analyzer determines the data about the overall forwarding performance of the service flow, which can refer to the existing determination method.

It can be seen from Example 2 that even if a SRv6 multicast packet is forwarded from the BIER domain to the SRv6 domain, upon receiving a SRv6 multicast packet (such as the packet 702) from the BIER domain, the ingress node (such as the device C2) of the SRv6 domain does not simply encapsulate the received SRv6 multicast packet (such as the packet 702) based on the SRv6 domain. Instead, the device C2 also refers to the first in-situ flow detection option carried in the SRv6 multicast packet (such as the packet 702) when encapsulating, so that the outer layer of the SRv6 multicast packet (such as the packet 702) is encapsulated with the outer packet header at least including the second in-situ flow detection option. Finally, the nodes in the SRv6 domain perform in-situ flow detection based on the second in-situ flow detection option carried in the outer packet header. Therefore, in-situ flow detection can be implemented when the SRv6 multicast packet is forwarded across domains.

The method according to the examples of the present disclosure has been described above, and an apparatus according to the examples of the present disclosure will be described below.

Figure 8:
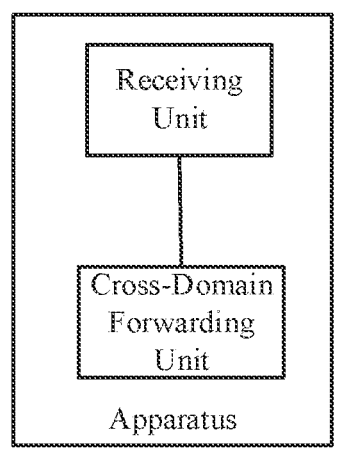
FIG. 8 is a block diagram of an apparatus according to an example of the present disclosure.

Referring to FIG. 8, FIG. 8 is a block diagram of an apparatus according to an example of the present disclosure. The apparatus is applied to network device. As shown in FIG. 8, the apparatus can include:

a receiving unit configured to receive a first service packet carrying a first packet header, where the first packet header includes at least a first in-situ flow detection option, the first in-situ flow detection option is added to the first packet header by an ingress node of a first network domain and is for indicating an in-situ flow detection;

a cross-domain forwarding unit configured to, when the network device is an ingress node of a second network domain, forward a second service packet in the second network domain; the second service packet is obtained by encapsulating a second packet header in an outer layer of the first service packet. The second packet header includes at least a second in-situ flow detection option, and the second in-situ flow detection option is for indicating that the in-situ flow detection is performed on a same service flow in a same in-situ flow detection mode as the first in-situ flow detection option.

Optionally, in this example, the second in-situ flow detection option is obtained by copying the first in-situ flow detection option; or, a detection control information field in the first in-situ flow detection option and a detection control information field in the second in-situ flow detection option include same detection control information; the detection control information is used to indicate the service flow and the in-situ flow detection mode.

Optionally, in this example, the detection control information field at least includes:

a FlowMonID field for indicating a service flow;
an in-situ flow detection mode field for indicating an in-situ flow detection mode.

The in-situ flow detection mode field includes at least one of the following fields:

an L field for indicating a packet loss flag;
a D field for indicating a delay flag;
a FlowMonID Ext field for indicating a node identifier of the ingress node of the first network domain;
an IOAM-Trace-type field for indicating a data type of the data for the in-situ flow detection.

Optionally, in this example, the FlowMonID field occupies 20 bits.

Optionally, in this example, the L field and the D field occupy 1 bit respectively.

Optionally, in this example, the FlowMonID Ext field occupies 20 bits.

Optionally, in this example, the IOAM-Trace-type field occupies 24 bits.

Optionally, in this example, the detection control information field further includes:

a Period field for indicating a period of the in-situ flow detection.

Optionally, in this example, the first in-situ flow detection option and the second in-situ flow detection option include other fields in addition to the detection control information field; where the other fields at least include:

a NextHeader field for indicating whether a type of extended data is carried, when the NextHeader field is a first value, it indicates that a type of extended data is not carried, and when the NextHeader field is a second value, it indicates that a type of extended data is carried;

a TLVs (Type-Length-Value) field indicating a type of extended data, for indicating extended data being carried in the TLVs field when the NextHeader field is the second value; the extended data includes at least identifiers of one or more nodes through which a service packet passes.

Optionally, in this example, the second packet header includes an IPv6 extension header. The second in-situ flow detection option is an option of DOH in the IPv6 extension header.

Optionally, in this example, the DOH further includes another option. The other option is a bit indexed explicit replication (BIER) packet header. The BIER packet header is used to carry forwarding information on the second service packet to be forwarded in the second network domain. When performing hop-by-hop in-situ flow detection, the second in-situ flow detection option is before the BIER packet header in the DOH. When performing end-to-end in-situ flow detection, the second in-situ flow detection option is after the BIER packet header in the DOH.

Optionally, in this example, the IPV6 extension header further includes a SRH. The SRH is used to carry path information on the second service packet to be forwarded in the second network domain. Optionally, when performing hop-by-hop in-situ flow detection option, the DOH is before the SRH in the IPV6 extension header. When performing end-to-end in-situ flow detection option, the DOH is after the SRH in the IPV6 extension header.

So far, the structure of the apparatus shown in FIG. 8 has been described.

Figure 9:
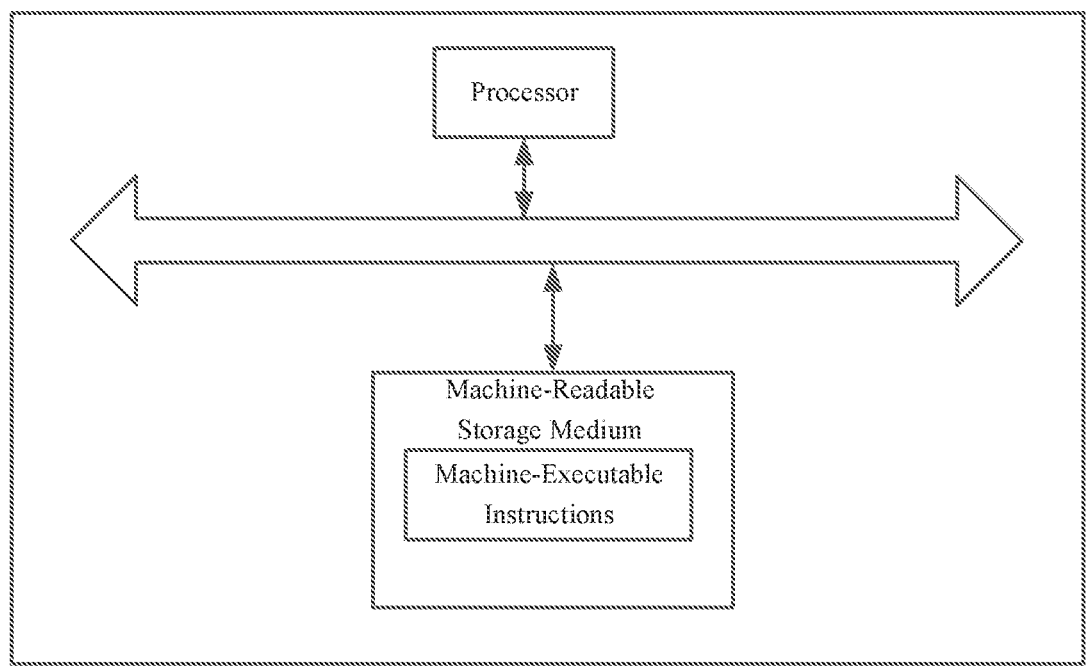
FIG. 9 is a hardware structural diagram of a device according to an example of the present disclosure.

An example of the present disclosure also provides a hardware structure of the apparatus shown in FIG. 8. Referring to FIG. 9, FIG. 9 is a hardware structural diagram of an electronic device according to an embodiment of the present disclosure. As shown in FIG. 9, the hardware structure can include: a processor and a machine-readable storage medium, where the machine-readable storage medium stores machine-executable instructions that can be executed by the processor; the processor is configured to execute the machine-executable instructions to implement the methods disclosed in the above examples of the present disclosure.

Based on the same application concept as the above method, an example of the present disclosure also provides a machine-readable storage medium, the machine-readable storage medium stores a number of computer instructions, and when the computer instructions are executed by a processor, the method disclosed in the above examples of the present disclosure can be implemented.

As an example, the machine-readable storage medium can be any electronic, magnetic, optical, or other physical storage device, which can contain or store information, such as executable instructions, data, and so on. For example, the machine-readable storage medium can be a Radom Access Memory (RAM), a volatile memory, a non-volatile memory, a flash memory, a storage drive (such as a hard drive), a solid state drive, and any type of storage disk (such as CD, DVD, or the like), or similar storage media, or a combination thereof.

The systems, devices, modules, or units explained in the above examples can be implemented by computer chips or entities, or implemented by products with certain functions. A typical implementation device is a computer. The specific form of the computer can be a personal computer, a laptop computer, a cellular phone, a camera phone, a smart phone, a personal digital assistant, a media player, a navigation device, an email receiving and sending device, and a game console, a tablet computer, a wearable device, or a combination of any of these devices.

For the convenience of description, when describing the above device, the functions are divided into various units and described separately. Of course, when implementing the present disclosure, the functions of each unit can be implemented in the same or multiple software and/or hardware.

Those skilled in the art should understand that the examples of the present disclosure can be provided as methods, systems, or computer program products. Therefore, the present disclosure can adopt the form of a complete hardware example, a complete software example, or an example combining software and hardware. Moreover, the examples of the present disclosure can adopt the form of computer program products implemented on one or more computer-usable storage media (including but not limited to disk storage, CD-ROM, optical storage, or the like) containing computer-usable program codes.

The present disclosure is described with reference to flowcharts and/or block diagrams of methods, devices (systems), and computer program products according to examples of the present disclosure. It should be understood that each process and/or block in the flowchart and/or block diagram, and the combination of processes and/or blocks in the flowchart and/or block diagram can be realized by computer program instructions. These computer program instructions can be provided to the processor of a general-purpose computer, a special-purpose computer, an embedded processor or other programmable data processing device to generate a machine, so that the instructions executed by the processor of the computer or other programmable data processing device generate an apparatus for implementing functions designated in one or more flows of the flowcharts and/or one or more blocks of the block diagrams.

Moreover, these computer program instructions can also be stored in a computer-readable memory that can guide a computer or other programmable data processing device to work in a specific manner, so that the instructions stored in the computer-readable memory generate manufactured products, the instruction device realizes the functions specified in one or more processes in the flowchart and/or one or more blocks in the block diagram.

These computer program instructions can also be loaded on a computer or other programmable data processing device, so that a series of operation steps are executed on the computer or other programmable device to produce computer-implemented processing, so that the instructions executed on the computer or other programmable device provide steps for implementing the functions specified in one or more processes in the flowchart and/or one or more blocks in the block diagram.

The above descriptions are only examples of the present disclosure, and are not intended to limit the present disclosure. For those skilled in the art, the present disclosure can have various modifications and changes. Any modification, equivalent replacement, improvement, or the like made within the spirit and principle of the present disclosure shall be included in the scope of the claims of the present disclosure.

The invention claimed is:

1. An in-situ flow detection method, applied to a network device, the method comprising:
receiving a first service packet carrying a first packet header, wherein the first packet header comprises at least a first in-situ flow detection option which is added to the first packet header by an ingress node of a first network domain and is for indicating an in-situ flow detection; wherein the first network domain further comprises a forwarding node, wherein the forwarding node is configured to receive and forward the first service packet carrying the first in-situ flow detection option, obtain corresponding data based on a data type indicated the first in-situ flow detection option, and reports the corresponding data to an analyzer; and
when the network device is an ingress node of a second network domain, the received first service packet is forwarded by the forwarding node of the first network domain to the network device, forwarding a second service packet in the second network domain; wherein the second service packet is obtained by encapsulating a second packet header in an outer layer of the first service packet comprising the first in-situ flow detection option by the ingress node of the second network domain, the second packet header comprises at least a second in-situ flow detection option, and the second in-situ flow detection option is for indicating that the in-situ flow detection is performed on a same service flow in a same in-situ flow detection mode as the first in-situ flow detection option.

2. The method according to claim 1, wherein the second in-situ flow detection option is obtained by copying the first in-situ flow detection option;
or,
a detection control information field in the first in-situ flow detection option and a detection control information field in the second in-situ flow detection option comprise same detection control information; the detection control information is used to indicate the service flow and the in-situ flow detection mode.

3. The method according to claim 2, wherein the detection control information field at least comprises:
a FlowMonID field for indicating a service flow;
an in-situ flow detection mode field for indicating an in-situ flow detection mode.

4. The method according to claim 3, wherein the in-situ flow detection mode field comprises at least one of the following fields:
an L field for indicating a packet loss flag;
a D field for indicating a delay flag;
a FlowMonID Ext field for indicating a node identifier of the ingress node of the first network domain;
an IOAM-Trace-type field for indicating a data type of data for the in-situ flow detection.

5. The method according to claim 4, wherein
the L field and the D field occupy 1 bit respectively; and/or,
the FlowMonID Ext field occupies 20 bits; and/or,
the IOAM-Trace-type field occupies 24 bits.

6. The method according to claim 3, wherein the FlowMonID field occupies 20 bits.

7. The method according to claim 3, wherein the detection control information field further comprises:
a Period field for indicating a period of the in-situ flow detection.

8. The method according to claim 2, wherein the first in-situ flow detection option and the second in-situ flow detection option comprise other fields in addition to the detection control information field;
the other fields at least comprise:
a NextHeader field for indicating whether a type of extended data is carried, wherein when the NextHeader field is a first value, the NextHeader field indicates that a type of extended data is not carried, and when the NextHeader field is a second value, the NextHeader field indicates that a type of extended data is carried;
a Type-Length-Values (TLVs) field indicating a type of extended data, for indicating extended data being carried in the TLVs field when the NextHeader field is the second value; wherein the extended data comprises at least identifiers of one or more nodes through which a service packet passes.

9. The method according to claim 1, wherein the second packet header comprises an IPV6 extension header,
wherein the second in-situ flow detection option is an option of a Destination Option Header (DOH) in the IPV6 extension header.

10. The method according to claim 9, wherein the DOH further comprises a Bit Indexed Explicit Replication (BIER) packet header for carrying forwarding information on the second service packet to be forwarded in the second network domain.

11. The method according to claim 10, wherein when performing hop-by-hop in-situ flow detection, the second in-situ flow detection option is before the BIER packet header in the DOH; when performing end-to-end in-situ flow detection, the second in-situ flow detection option is after the BIER packet header in the DOH.

12. The method according to claim 9, wherein the IPV6 extension header further comprises a Segment Routing Header (SRH) for carrying path information on the second service packet to be forwarded in the second network domain.

13. The method according to claim 12, wherein when performing hop-by-hop in-situ flow detection option, the DOH is before the SRH in the IPv6 extension header; when performing end-to-end in-situ flow detection option, the DOH is after the SRH in the IPV6 extension header.

14. An electronic device, comprising a processor and a machine-readable storage medium;
wherein the machine-readable storage medium stores machine-executable instructions that can be executed by the processor;
the processor is configured to execute the machine-executable instructions to perform:
receiving a first service packet carrying a first packet header, wherein the first packet header comprises at least a first in-situ flow detection option which is added to the first packet header by an ingress node of a first network domain and is for indicating an in-situ flow detection; wherein the first network domain further comprises a forwarding node, wherein the forwarding node is configured to receive and forward the first service packet carrying the first in-situ flow detection option, obtain corresponding data based on a data type indicated the first in-situ flow detection option, and reports the corresponding data to an analyzer; and when the network device is an ingress node of a second network domain, the received first service packet is forwarded by the forwarding node of the first network domain to the network device, forwarding a second service packet in the second network domain; wherein the second service packet is obtained by encapsulating a second packet header in an outer layer of the first service packet comprising the first in-situ flow detection option by the ingress node of the second network domain, the second packet header comprises at least a second in-situ flow detection option, and the second in-situ flow detection option is for indicating that the in-situ flow detection is performed on a same service flow in a same in-situ flow detection mode as the first in-situ flow detection option.

15. The electronic device according to claim 14, wherein the second in-situ flow detection option is obtained by copying the first in-situ flow detection option;
or,
a detection control information field in the first in-situ flow detection option and a detection control information field in the second in-situ flow detection option comprise same detection control information; the detection control information is used to indicate the service flow and the in-situ flow detection mode.

16. The electronic device according to claim 15, wherein the detection control information field at least comprises:
a FlowMonID field for indicating a service flow;
an in-situ flow detection mode field for indicating an in-situ flow detection mode.

17. The electronic device according to claim 16, wherein the in-situ flow detection mode field comprises at least one of the following fields:
an L field for indicating a packet loss flag;
a D field for indicating a delay flag;
a FlowMonID Ext field for indicating a node identifier of the ingress node of the first network domain;
an IOAM-Trace-type field for indicating a data type of data for the in-situ flow detection.

18. The electronic device according to claim 16, wherein the detection control information field further comprises:
a Period field for indicating a period of the in-situ flow detection.

19. The electronic device according to claim 15, wherein the first in-situ flow detection option and the second in-situ flow detection option comprise other fields in addition to the detection control information field;
the other fields at least comprise:
a NextHeader field for indicating whether a type of extended data is carried, wherein when the NextHeader field is a first value, the NextHeader field indicates that a type of extended data is not carried, and when the NextHeader field is a second value, the NextHeader field indicates that a type of extended data is carried;
a Type-Length-Values (TLVs) field indicating a type of extended data, for indicating extended data being carried in the TLVs field when the NextHeader field is the second value; wherein the extended data comprises at least identifiers of one or more nodes through which a service packet passes.

20. A non-transitory machine-readable storage medium storing computer instructions, wherein the computer instructions are executed by a processor to implement an in-situ flow detection method comprising:
receiving a first service packet carrying a first packet header, wherein the first packet header comprises at least a first in-situ flow detection option which is added to the first packet header by an ingress node of a first network domain and is for indicating an in-situ flow detection; wherein the first network domain further comprises a forwarding node, wherein the forwarding node is configured to receive and forward the first service packet carrying the first in-situ flow detection option, obtain corresponding data based on a data type indicated the first in-situ flow detection option, and reports the corresponding data to an analyzer; and
when the network device is an ingress node of a second network domain, the received first service packet is forwarded by the forwarding node of the first network domain to the network device, forwarding a second service packet in the second network domain; wherein the second service packet is obtained by encapsulating a second packet header in an outer layer of the first service packet comprising the first in-situ flow detection option by the ingress node of the second network domain, the second packet header comprises at least a second in-situ flow detection option, and the second in-situ flow detection option is for indicating that the in-situ flow detection is performed on a same service flow in a same in-situ flow detection mode as the first in-situ flow detection option.

* * * * *